United States Patent

Nicholls

[15] 3,681,524

[45] Aug. 1, 1972

[54] MULTIPLE FREQUENCY TIME CODE GENERATOR AND READER

[72] Inventor: William C. Nicholls, Yorktown Heights, N.Y.

[73] Assignee: Columbia Broadcasting System, Inc., New York, N.Y.

[22] Filed: June 16, 1970

[21] Appl. No.: 46,754

[52] U.S. Cl. ...178/6.6 A, 179/100.2 B, 179/100.2 S, 340/174.1 A, 340/174.1 J

[51] Int. Cl. .......G11b 5/06, G11b 27/14, H04n 5/78

[58] Field of Search............178/6.6 A; 179/100.2 S, 15.55 TC, 179/100.2 B; 340/174.1 A, 174.1 J, 174.1 G

[56] References Cited

UNITED STATES PATENTS 2,295,000 9/1942 Morse.....................179/100.2 S
3,564,161 2/1971 Takishima..................178/6.6 A
2,702,315 2/1955 Roderick...............340/174.1 A

*Primary Examiner*—Howard W. Britton
*Attorney*—Brumbaugh, Graves, Donohue & Raymond

[57] ABSTRACT

As described herein, a multiple frequency time code generator generates sequentially at least two series of time code signals for separately identifying the television information signals with which both series of time code signals are associated. The time code signals have different frequencies and are adapted to be recorded on a separate track of a video tape recorder and reproduced therefrom at tape speeds ranging from 1.5 inches per second (ips) to 450 ips. A reader separates the reproduced time code signals into different output channels.

15 Claims, 3 Drawing Figures

INVENTOR.
WILLIAM C. NICHOLLS
BY
Brumbaugh, Graves, Donohue & Raymond
his ATTORNEYS INVENTOR.
WILLIAM C. NICHOLLS
BY
Brumbaugh, Graves, Donohue & Raymond
his ATTORNEYS

MULTIPLE FREQUENCY TIME CODE GENERATOR AND READER

BACKGROUND OF THE INVENTION

This invention relates to apparatus for recording time code information on a storage medium, such as a magnetic tape, and, more particularly, to a new and improved multiple frequency time code generator and reader therefore for generating and reading sequentially a plurality of different frequency time code signals which separately identify the television information signals with which the time code signals are associated.

The editing of video tapes under electronic control is now common in the television industry. The manufacturers of electronic editing equipment have devised several editing control codes in order to identify the recorded television information. Unfortunately, the presently devised codes have applicability only to a particular manufacturer's electronic editing equipment and are not compatible with the equipment made by other manufacturers. Thus, while the presently devised codes have generally been an effective means for identifying the television information for editing purposes, there exists a need in the industry for a standardized editing control code. Such standardization would permit the interchange of program tapes between users and would permit the interchangeable use of different equipment to edit and control the video tapes.

In developing a standardized control code, the following criteria should be met: (1) The code should contain sufficient information to locate accurately any desired video frame within a reel of tape. (2) The code should be readable when the tape operates in both the forward and reverse directions and be insensitive to tape speed, viz., it must be readable in both the fast-forward and fast-reverse operation of the tape without requiring any modification of the audio channel electronics. (3) The code should be capable of transmission over conventional telephone lines and amplifiers in order to permit the economical distribution of the code over a wide area without the necessity for a special coaxial cable network. (4) The complete code should in the least define hours, minutes, seconds and frame numbers. (5) The code should indicate forward and reverse tape directions and should provide means to permit the synchronization of two or more video tape machines. (6) The code should be usable by all types of video and audio recorders to allow playback synchronization between audio recorders and different type video recorders. As above-mentioned, the bandwidth requirements within the conventional audio recorders should be satisfied. (7) The code should provide space for control and auxiliary information in addition to the basic time and frame coding.

SUMMARY OF THE INVENTION

It is therefore an object of the invention to provide a multiple frequency time code generator for generating an editing control code which satisfies each of the criteria mentioned above.

It is also an object of the present invention to provide a reader for reading an editing control code which satisfies each of the foregoing criteria.

These and other objects of the invention are accomplished by providing a multiple frequency time code generator for generating sequentially a plurality of different frequency time code signals which separately identify the television information with which the time code signals are associated. The signals are adapted to be recorded on a separate track of the storage medium on which the television information is recorded and reproduced therefrom over a wide range of recording and reproducing speeds.

In a preferred embodiment of the invention, the generator generates sequentially a first time code signal having a selected low frequency that identifies the television information and a second time code signal having a frequency substantially higher than the selected low frequency for similarly identifying the television information. The time code has a format such that each frame period (2/59.94 sec) is divided into two parts with a different code being inserted into each part.

DESCRIPTION OF THE PREFERRED EMBODIMENT

Figure 1:
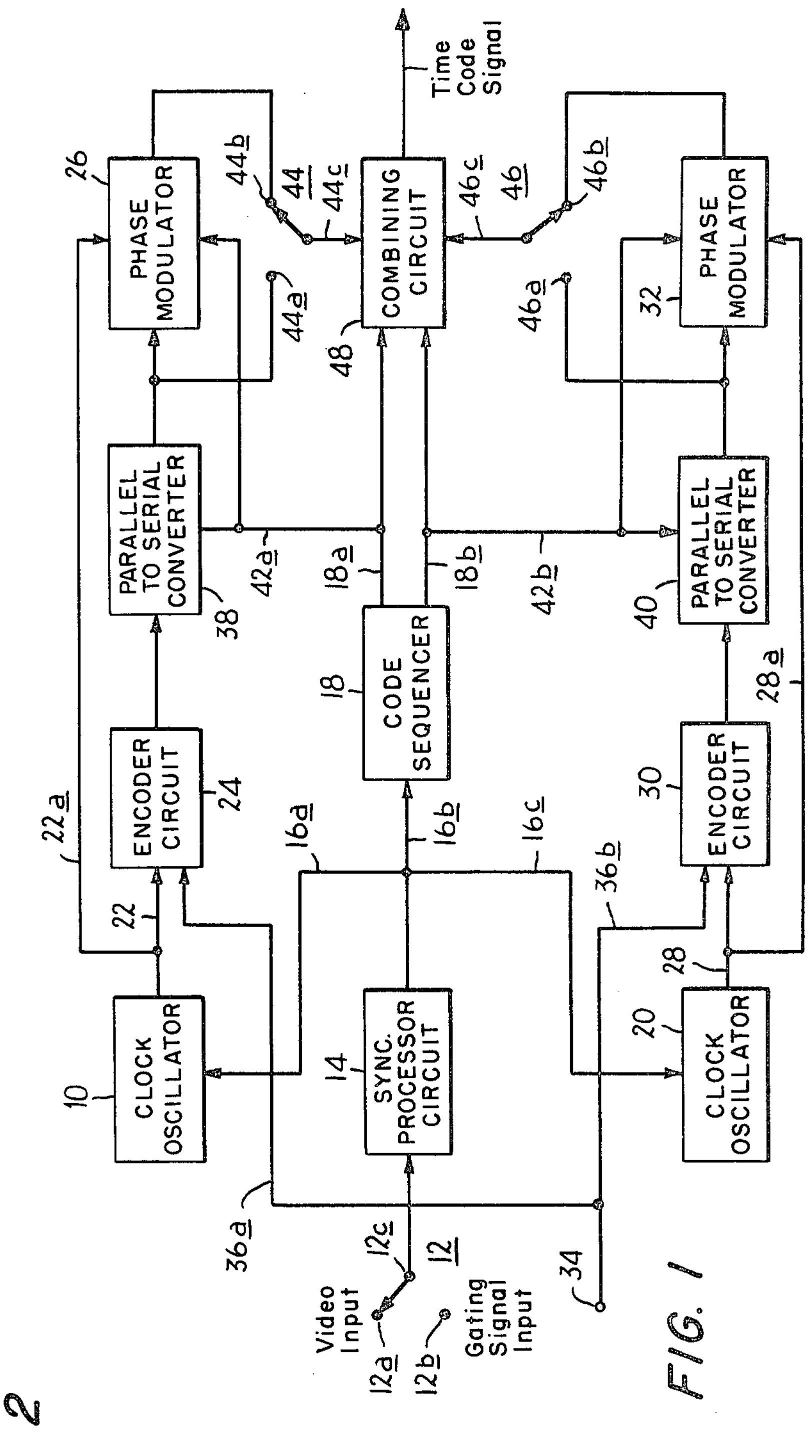
FIG. 1 is a schematic block diagram of a typical multiple frequency time code generator arranged according to the present invention.

In the illustrative embodiment of a multiple frequency time code generator arranged according to the present invention, as shown in FIG. 1, a first clock oscillator 10 is provided for generating a first series of pulses having, for example, a frequency of twice the field rate or 119.88 Hertz (Hz) (2 bits × 59.94). In the preferred embodiment of the invention, two time codes are generated by the generator for recording on the cue track of a video tape recorder in a predetermined time period. As will be described hereinbelow, the format of the time code is such that each frame (2/59.94 second) is divided into two equal parts with a so-called "slow" bit rate time code being inserted onto the cue track during 1/59.94 second, and a socalled "fast" bit rate time code being inserted onto the cue track during the next 1/59.94 second. Such a time code may be thought of as a "split frame" time code. Although the time code is described as having two different frequency components, the time code may possess any number of different frequency components. The only constraint on the frequency of such components is that the components must be reproducible at at least one tape speed.

The generator includes an input switch 12 having an input terminal **12*a* to which the video is supplied and an input terminal 12*b* to which a reference gating signal is supplied. Such gating signal may be a reference 60 Hz signal that is appropriately shaped and reduced in amplitude or a clock signal having a variable frequency. The contact arm 12*c* of the switch is connected to a sync processor circuit 14 which, in the case of a video signal being supplied to it via the terminal 12***a* and the contact arm 12*c*, separates the V-drive signal from the video and appropriately clips and shapes the V-drive signal. Where a reference 60 Hz signal or a multiple frequency gating signal is supplied to the processor via the terminal 12*b* and the contact arm 12*c*, the processor shapes and clips such signals to provide an appropriate gating signal.

From the processor 14, the gating signal is supplied concurrently to an input terminal of the clock oscillator 10 via a conductor 16*a*, the input terminal of a code sequencer circuit 18 via a conductor 16*b* and to an input terminal of a second clock oscillator 20 via a conductor 16*c*. The oscillator 20 generates a second series of pulses having, for example, a frequency of 2877.12 Hz (48 bits × 59.94). The gating signal supplied over the conductors 16*a* and 16*c* to the oscillators 10 and 20 functions to synchronize the operation of the two oscillators 10 and 20 with the input video signal or gating signal, as the case may be, and with each other as required.

A conductor 22 and its branch conductor 22*a* connect the output of the clock oscillator 10 and thus the first series of timing pulses to the input terminal of an encoder circuit 24 and to an input terminal of a phase modulator 26. Similarly, a conductor 28 and its branch conductor 28*a* couple the second source of timing pulses from the clock oscillator 20 to an input terminal of an encoder circuit 30 and to an input terminal of a phase modulator 32. The other input terminals of the encoder circuits 24 and 30 are connected together and to an input terminal 34 via cables 36*a* and 36*b*. Signals representative of random identifying data, such as scene number, take number and the like are supplied to the input terminal 34 and combined with the time code information within the circuits 24 and 30 in forming the ultimate time code signals. The encoder circuits 24 and 30 which may be of conventional construction, including for example binary counters, encode from the 119.88 Hz and 2877.12 Hz input signals supplied thereto parallel time code signals representative of hours, minutes, seconds and frames. In addition, the encoders provide as parallel binary digital bits information relating to code synchronization (sync) and random data such as scene number, take number and the like.

Coupled to the output terminals of the encoder circuits 24 and 30 are a pair of parallel to serial converters 38 and 40, which may be, for example, conventional shift registers. When enabled, the converters 38 and 40 convert the parallel digital time code information supplied thereto into a serial format. The converters 38 and 40 are enabled every other field period, however, and to this end receive such enabling signals from the code sequencer 18 over a pair of cables 42*a* and 42*b*, respectively. As above mentioned, the processor unit 14 detects the V-drive signal in the developed video or some other gating signal (60 Hz) and supplies this signal to the code sequencer 18. The sequencer 18, which may simply comprise a flip-flop circuit, produces enabling signal at its two output terminals 18*a* and 18*b* every other field period in the situation where a V-drive signal or a 60 Hz signal is detected. Thus, during a first field period (1/59.94 second) an enabling signal appears at the terminal 18*a* and during the next field period (1/59.94 second) an enabling signal appears at the terminal 18*b*. In the event a variable frequency gating signal is supplied to the processor circuit 14, the code sequencer 18 will change states in accordance with such signal to alternately enable the converters 38 and 40.

The output terminals of the converters 38 and 40 are coupled to the input terminals of the phase modulators 26 and 32 and to the input terminals 44*a* and 46*a* of a pair of switches 44 and 46, respectively. The other input terminals at the modulator circuits 26 and 32 are connected by the conductors 42*a* and 42*b* to the output terminals 18*a* and 18*b*, respectively, of the code sequencer circuit 18. The modulator circuits 26 and 32 are alternately enabled by enabling signals produced by the code sequencer 18 to thereby avoid the generation cross-talk and the like noise signals which could otherwise result if the modulators were operated simultaneously. In the modulators 26 and 32, the serial time code signals produced by the converters 38 and 40 are impressed upon the carrier signals supplied thereto by way of conductors 22*a* and 28*a* from the oscillators 10 and 20 in a well-known manner to produce a biphase mark or Manchester I type code signal. As is understood in the art, with phase modulated time code signals, the code information is contained in the zero axis crossings. Thus, the phase modulated signal is reasonably insensitive to carrier amplitude as long as the zero crossings are undistorted.

The output terminals of the modulators 26 and 32 are connected to the other terminals 44*b* and 46*b* if the switches 44 and 46, respectively. The center taps 44*c* and 46*c* of the switches are connected to the input terminals of a combining circuit 48 which also receives every other cycle, 1/59.95 sec. e.g., enabling signals produced by the code sequencer 18. The combining circuit 48 which may comprise, for example, a pair of AND gates having their first input terminals coupled to the output terminals 18*a* and 18*b* of the code sequencer 18, their second input terminals connected to the center taps 44*c* and 46*c* of the switches 44 and 46 and their output terminals coupled together and to the input terminal of an amplifier. In response to the enabling signals received from the code sequencer circuit 18, the AND gates will be alternately enabled and will alternatively transmit the time code signals received from the phase modulator 26 via the switch 44 and the time code signals received from the phase modulator 32 via the switch 46. Thus, the combining circuit 48 alternately transmits the slow and the fast time code signals received from the modulators 26 and 32 to provide a time code signal having a split frame configuration. In the event that it is desired to generate an unmodulated serial time code signal, it is necessary only to connect the center taps of the switches 44 and 46 to the terminals 44*a* and 44*b*. Similarly, if it is desired to display the time code information it is necessary only to couple the output terminals of the encoder circuits 24 and 30 to an optical display unit comprising, for example, NIXIE tubes.

Figure 2:
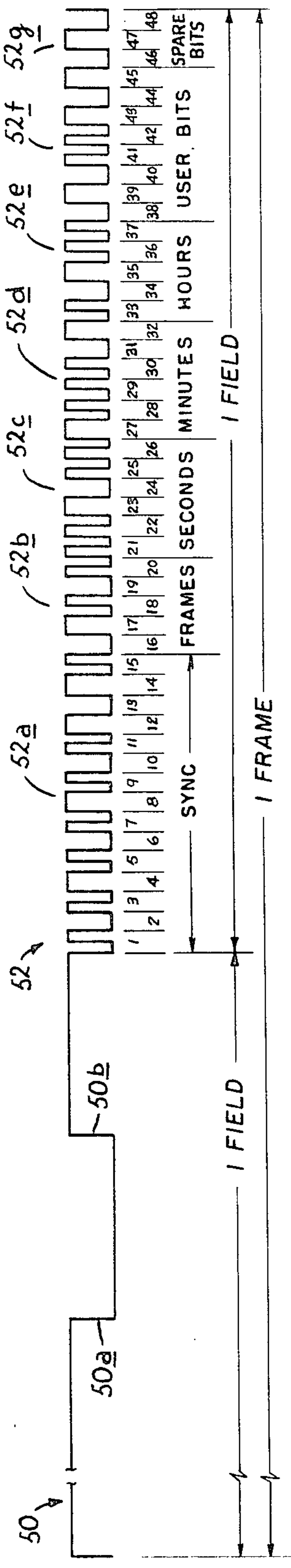
FIG. 2 illustrates graphically a typical format of the time code generated by the generator of FIG. 1.

Referring now to FIG. 2, there is graphically shown a typical split frame time code signal that is generated by the generator of FIG. 1 for recording on the audio track, for example, of a magnetic tape carried by a magnetic tape recorder. The code includes a series 50 of signals having a frequency rate of 119.88 Hz. As shown, the first series includes a phase modulated code signal having two axis crossings 50*a* and 50*b* to indicate the presence of two binary bits. Because of the one field switching implemented by the code sequencer 18, the first time code signal occupies a time duration of one field as indicated by labelled arrows or 1/59.94 sec. It will be noted that because of the slow bit time code frequency of 119.88 Hz, a maximum of two bits may be recorded each 1/59.94 sec.

The fast bit code developed by the modulator 32 occupies the next 1/59.94 sec and includes a fifteen bit synchronizing code 52*a*, a five bit binary frame code 52*b*, a six bit second code 52*c*, a six bit binary minute code 52*d*, a five bit binary hour code 52*e*, an eight bit binary code 52*f* for user identifying data such as take number, scene number and the like, and three spare bits. Here again, because of the frequency limitation (2877.12 Hz), a maximum of 48 bits may be recorded each 1/59.94 sec. To record additional bits of information, it would be necessary to increase the frequency of the clock oscillator 20 accordingly.

The synchronizing code shown in FIG. 2 consists of the bit pattern 101010101010001 i.e., alternate "1"s and "0"s with the exception of the thirteenth bit, which is arbitrarily selected as an example of an identifying word for the fast bit code 52. In practice, an empirically derived word having a bit configuration unlike any bit configuration reasonably expected to occur in the rest of the code will be used as the synchronizing word. As is understood in the art, the synchronizing word is provided for decoding purposes and can be used as a control signal for synchronizing two tape machines during playback. Also, the word may be used to sense the direction of tape motion. Direction of the tapes can be sensed by treating the status of a particular bit in the synchronizing word, e.g., bit 3, after the detection of synchronization.

With respect to the time illustrated in binary form in FIG. 2, the time is 19 hours, 28 minutes, 51 seconds and 5 frames. During the next frame period, the binary representation for hours, minutes and seconds would remain the same only with frame number given as bit pattern 00110 (6). With respect to so-called user binary bit pattern of 0001100 this may represent take one, scene 8, for example.

In view of the foregoing, it will be seen that during each frame period, a partial time code 50 (up to two bits) is recorded at a frequency of 119.88 Hz for 1/59.94th of a second, while a complete time code is recorded at a frequency of 2877.12 Hz during the next 1/59.94th of a second. At the end of 30 frames or slightly more than one second, a complete time code will have been recorded at the slow bit rate, while the time code will have been recorded 30 times at the fast bit rate. To this end, an exemplary format for the slow bit time code may be:

| Frame No. | Indication | No. of Bits |
|---|---|---|
| 1 | hours | 2 |
| 2 | hours | 2 |
| 3 | hours | 1 |
| 4 | minutes | 2 |
| 5 | minutes | 2 |
| 6 | minutes | 2 |
| 7 | seconds | 2 |
| 8 | seconds | 2 |
| 9 | seconds | 2 |
| 11 | scene | 2 |
| 12 | scene | 2 |
| 13 | scene | 2 |
| 14 | scene | 2 |
| 15 | take | 2 |
| 16 | take | 2 |
| 17 | take | 2 |
| 18 | cue | 1 |
| 19 | sync | 2 |
| 20 | sync | 2 |
| 21 | sync | 2 |
| 22 | sync | 2 |
| 23 | sync | 2 |
| 24 | sync | 1 |
| 25 | spare | 2 |
| 26 | spare | 2 |
| 27 | spare | 2 |
| 28 | spare | 2 |
| 29 | spare | 2 |
| 30 | spare | 2 |

Within the video tape recorder, the codes are recorded at 15 inches per second (ips) and read back at speeds ranging from about 1.5 inches to about 450 inches per second. By utilizing a split frame time code recording system wherein two time codes 50 and 52 are recorded within each frame period, the audio channel will be able to accommodate the code 52 from about 1.5 ips up to about 30 ips. The reduction in the frequency of the developed time code 50 will further enable the audio channel to accommodate the code 50 at reproduction speeds ranging from about 7.5 ips to about 450 ips. It is noteworthy that both time codes are readable at the normal play speed of 15 ips to provide a check on the accuracy of the two recorded time codes. During reproduction, because of bandwidth limitations, the slow bit time code 50 will disappear at tape reproduction speeds of less than approximately 7.5 ips and the fast bit time code 52 will disappear at tape reproduction speeds greater than approximately 30 ips. In each case, however, the surviving code provides the desired identifying data.

Figure 3:
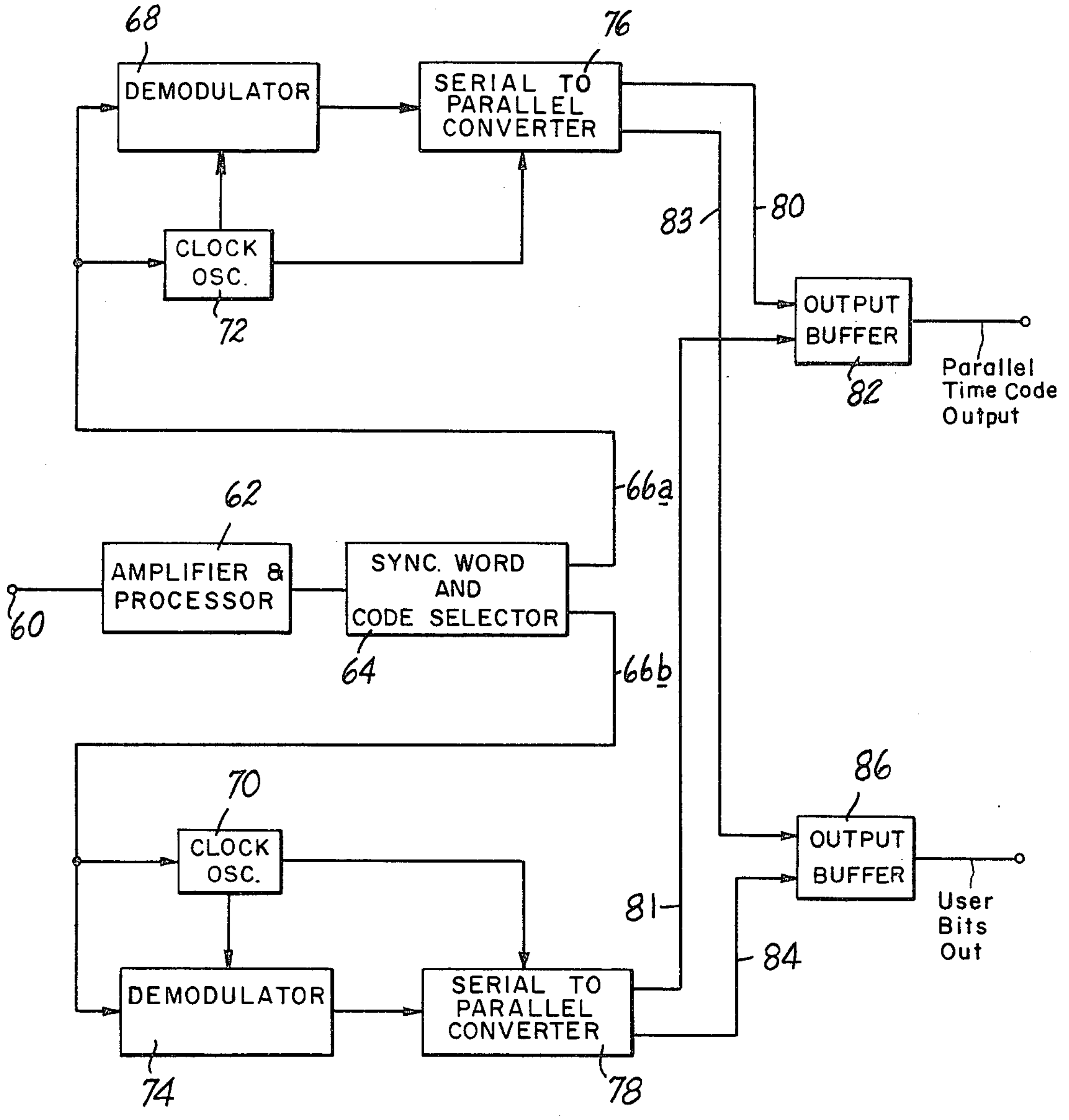
FIG. 3 is a schematic block diagram of a typical multiple frequency time code reader arranged according to the present invention.

Referring now to FIG. 3, there is shown an arrangement for reading the sequential time codes of the type illustrated in FIG. 2 reproduced from the cue track of a video tape recorder. The reader includes an input terminal 60 to which the sequential time code signals are supplied and a conventional amplifier and processor circuit 62 for amplifying and wave shaping the time code signals. From the circuit 62, the signals are supplied to a sync word detector and code selector circuit 64 which separates the slow and fast bit time codes 50 and 52 into two separate output channels 66*a* and 66*b*. Such detector may simply comprise a counter and digital comparator for separating the two time code signals. The code selector logic of the circuit 64 may simply comprise a pair of AND gates which are alternately enabled periodically, e.g., 1/59.94 sec, as when the code is reproduced at the normal speed, or at a slower or higher frequency depending upon the tape reproduction speed, to transmit the slow and fast bit time codes 50 and 52 into the output channels 66*a* and 66*b* provided the appropriate sync words have been detected. As will be understood, the AND gates should be triggered only when the amplitudes of the time code signals are above a selected amplitude level. In this way, when the tape reproduction speed varies to render either the slow or fast bit times codes unintelligible, such unintelligible information will not be transmitted by the AND gates.

From the detector and the code selector circuit 64, the slow bit and fast bit time code signals 50 and 52 are supplied along the channels 66*a* and 66*b* to a pair of demodulator circuits 68 and 70, respectively. The demodulators 68 and 70 are driven by a pair of clock oscillators 72 and 74, respectively, operating at the slow and fast bit time code rates of 119.88 Hz and 2877.12 Hz, respectively. The time code signals are supplied to the oscillators 72 and 74, as indicated, and function to synchronize the operation of the oscillators with the time code signals. As conventionally practiced, the demodulators 68 and 70 extract the phase modulation from the signals 50 and 52 and supply the time code signals in digital binary form to a pair of serial-to-parallel converters 76 and 78. The serial-to-parallel converters 76 and 78 are also driven by the 119.88 Hz and 2877.12 Hz signals developed by the clock oscillators 72 and 74 and function to convert the serial time code signals into parallel digital data bits. In this manner, the detected time code signals are made available in parallel form.

The converted time code signals, which as above noted, are representative of time, e.g., hours, minutes, seconds and frames, are transferred in parallel by way of cables 80 and 81, respectively, to the input terminals of an output buffer circuit 82. The parallel time code signals representative of user data, e.g., take number, scene number and the like, are transferred by way of conductors 83 and 84 to an output buffer circuit 86. When isolated in the buffers 82 and 86 which may also function to shape and/or invert the parallel time code signals, the time representative binary bits and user data representative binary bits may be transferred to a computer, for example, which records the data for subsequent editing operations.

Generally, the time code readers include optical displays for displaying the time code data retrieved from a recorded video track. To provide such display in the reader illustrated in FIG. 3, the appropriate coupling between the converters 76 and 78 and an optical display device comprising, for example, NIXIE tubes need only be made.

Although the invention has been described herein with reference to specific embodiments of a multiple frequency time code generator and multiple frequency time code reader, it will be understood that various modifications can be made in the configuration of these devices, as well as the time code signal generated and detected by these devices, without departing from the applicant's inventive contribution. Accordingly, all such variations and modifications are included within the intended scope of the invention as defined by the following claims.

I claim:

1. A multiple time code frequency generator comprising means for generating a plurality of different frequency time code signals to thereby separately identify television information signals with which the time code signals are associated, and output means for supplying sequentially said plurality of different frequency time code signals as output signals.

2. A multiple time code frequency generator according to claim 1 wherein the output means comprises means for transmitting each of said plurality of different frequency time code signals as an output signal for a selected period of time.

3. A multiple time code frequency generator according to claim 2 wherein the output means comprises means for transmitting each of said plurality of different frequency time code signals as an output signal for the same time period consisting of a fraction of a second.

4. A multiple time code frequency generator according to claim 2 wherein the generating means comprises means for generating first time code signals having a predetermined frequency and means for generating second time code signals having a frequency substantially higher than the frequency of the first time code signals and wherein the output means comprises means for alternately supplying the first and second time code signals as output signals within a predetermined time period.

5. A multiple time code frequency generator according to claim 4 wherein the first time code signal generating means comprises means for generating a series of pulses having a selected frequency, encoder means for encoding time code signals representative of television information identifying data and modulator means responsive to the encoded time code signals for phase modulating the signals to produce biphase time code signals.

6. A multiple time code frequency generator according to claim 5 wherein the second time code signal generating means comprises means for generating a series of pulses having a frequency substantially higher than the selected frequency of the first time code signals, encoder means for encoding time code signals representative of the same television information identifying data represented by the first time code signals and modulator means responsive to the encoded time code signals for phase modulating the signals to produce biphase time code signals.

7. A multiple time code frequency generator according to claim 6 wherein the output means comprises means for alternately supplying as output signals a portion of the first biphase time code signals representative of a portion of the television information identifying data and the entire second biphase time code signals representative of the entire television information identifying data

8. A multiple time code frequency generator according to claim 7 wherein a portion of the first biphase time code signals are transmitted for one television field period and the second biphase time code signals are transmitted for one television field period.

9. A multiple time code frequency generator according to claim 8 wherein a maximum of two signals out of the entire first biphase time code signals are transmitted for one television field period during each television frame period.

10. In a storage medium adapted to have recorded thereon television information signals, the improvement comprising an area on said storage medium adapted to have recorded thereon data for identifying said recorded television information signals, said data comprising first and second alternately generated time code signals, said first time code signals having a predetermined low frequency and said second time code signals having a frequency substantially higher than the low frequency of the first time code signals.

11. The improvement according to claim 10 wherein said first time code signals comprise a plurality of digital data bits for identifying the recorded television information signals and wherein a selected number of digital data bits are generated alternately with said second time code signals.

12. The improvement according to claim 11 wherein said second time code signals comprise a plurality of digital data bits for identifying the same recorded television information signals and wherein the said plurality of digital data bits are generated alternately with the selected number of digital data bits of the first time code signals.

13. A multiple time code frequency reader comprising means adapted to respond to a plurality of different frequency serial time code signals reproduced from a storage medium, each of said different frequency time code signals identifying the same television information signals, for separating said different frequency time code signals into a corresponding number of separate channels and means for converting said time code signals into a parallel digital data bit format.

14. A multiple time code frequency reader according to claim 13 wherein the reproduced time code signals comprise first and second serial biphase mark time code signals having different frequencies and wherein the conversion means comprises means for extracting the phase modulation from said separated different frequency biphase mark time code signals.

15. A multiple time code frequency reader according to claim 14 wherein the conversion means comprises means responsive to the detected different frequency time code signals for converting said time code signals into a parallel digital data bit format.

* * * * *